UNITED STATES PATENT OFFICE.

THOMAS ROUSE AND HERRMANN COHN, OF LONDON, ENGLAND.

PROCESS OF AGGLOMERATING IRON-WASTE, &c., FOR THE MANUFACTURE OF ORE BRIQUETS.

No. 797,150.     Specification of Letters Patent.     Patented Aug. 15, 1905.

Application filed November 28, 1904. Serial No. 234,680.

*To all whom it may concern:*

Be it known that we, THOMAS ROUSE, residing at 7 Oldhill street, Stamford Hill, and HERRMANN COHN, residing at 7 Brunswick Square, St. Pancras, London, in the county of Middlesex, England, British subjects, have invented new and useful Improvements in the Process of Agglomerating Powdered Ferruginous Matter for the Manufacture of Briquets for Reduction in Furnaces, being improvements on the process for which we were granted United States Patent No. 758,853.

The powdered ferruginous matter is dried and freed as far as possible from silica and other extraneous matter in order that the binding solution may act directly upon the iron or iron oxid in the ferruginous matter.

A binding solution is used prepared as follows: About one part, by weight, of alum is dissolved in two hundred parts, by weight, of water and about two measures of commercial water-glass are added to every hundred measures of such alum solution, and about one part, by weight, of the solution thus prepared is absorbed in the mixing process by twenty parts, by weight, of the powdered concentrated ferruginous matter.

The quantity mentioned of the solution prepared as described evenly distributed over every particle of the powdered concentrated ferruginous matter by thorough mixing prevents disruption of the molded briquets during the drying, hardening, and heating, and they retain their form up to melting-point.

The mixing of the powdered concentrated ferruginous matter with the solution and the subsequent molding, pressing, and hardening of the briquets may be performed in any known suitable way. When well mixed by hand and molded by hand, the briquets will dry in the atmosphere in a few days and acquire sufficient stability for immediate smelting or reduction in a furnace; but if required for transport it is necessary to harden them by exposure to a higher temperature than that of the atmosphere. A temperature of 700° centigrade is found suitable.

What we claim as our invention, and desire to secure by Letters Patent, is—

The herein-described process consisting in mixing powdered concentrated ferruginous matter with a solution of alum and water-glass, forming the agglomerated material thus obtained into briquets and then subjecting the briquet to the action of a furnace.

In testimony whereof we have subscribed our names to this specification in the presence of two subscribing witnesses.

THOMAS ROUSE.
           HERRMANN COHN.

Witnesses:
     THOS. WILKINS,
     DAVID J. MOCKRIDGE.